United States Patent

Morcom

(10) Patent No.: US 11,531,094 B2
(45) Date of Patent: Dec. 20, 2022

(54) METHOD AND SYSTEM TO DETERMINE DISTANCE USING TIME OF FLIGHT MEASUREMENT COMPRISING A CONTROL CIRCUITRY IDENTIFYING WHICH ROW OF PHOTOSENSITIVE IMAGE REGION HAS THE CAPTURED IMAGE ILLUMINATION STRIPE

(71) Applicant: Photonic Vision Limited, Sevenoaks Kent (GB)

(72) Inventor: Christopher John Morcom, Westbere Kent (GB)

(73) Assignee: PHOTONIC VISION LIMITED, Sevenoaks Kent (GB)

( * ) Notice: Subject to any disclaimer, the term of this patent is extended or adjusted under 35 U.S.C. 154(b) by 642 days.

(21) Appl. No.: 16/495,830

(22) PCT Filed: Mar. 21, 2018

(86) PCT No.: PCT/GB2018/050728
§ 371 (c)(1),
(2) Date: Sep. 20, 2019

(87) PCT Pub. No.: WO2018/172767
PCT Pub. Date: Sep. 27, 2018

(65) Prior Publication Data
US 2020/0096619 A1    Mar. 26, 2020

(30) Foreign Application Priority Data
Mar. 21, 2017 (GB) ...................................... 1704452

(51) Int. Cl.
*G01S 7/48* (2006.01)
*G01S 7/4863* (2020.01)
(Continued)

(52) U.S. Cl.
CPC .......... *G01S 7/4863* (2013.01); *G01S 7/4865* (2013.01); *G01S 7/497* (2013.01)

(58) Field of Classification Search
CPC . G01S 7/48; G01S 17/88; G01S 17/89; G01S 7/49; H01L 27/146
(Continued)

(56) References Cited

U.S. PATENT DOCUMENTS 4,656,518 A    4/1987   Kosonocky et al.
5,134,087 A    7/1992   Hynecek
(Continued)

FOREIGN PATENT DOCUMENTS

WO    2013040121    3/2013

OTHER PUBLICATIONS

International Preliminary Report On Patentability dated Oct. 3, 2019.
(Continued)

*Primary Examiner* — Que Tan Le
(74) *Attorney, Agent, or Firm* — Thomas Coester Intellectual Property

(57) ABSTRACT

A time of flight sensor has an image region and a storage region on a device which may be a CCD. A pulse of light illuminates an object, and an image illumination stripe is recorded on the image region. In a distance determining step, the image region is clocked after emitting the pulse of light and the row in which the image illumination stripe is illuminated gives a measure of the distance to the object. The apparatus can self calibrated by emitting a pulse of light without clocking the image region.

10 Claims, 5 Drawing Sheets

(51) Int. Cl.
  *G01S 7/4865* (2020.01)
  *G01S 7/497* (2006.01)
(58) Field of Classification Search
  USPC .................................. 250/221, 208.1, 214 R
  See application file for complete search history.

(56) References Cited

U.S. PATENT DOCUMENTS

| | | |
|---|---|---|
| 6,278,480 B1 * | 8/2001 | Kurahashi ............ H04N 13/167 396/326 |
| 7,515,082 B2 | 4/2009 | Hillis et al. |
| 8,054,363 B2 | 11/2011 | Robbins |
| 9,142,591 B2 | 9/2015 | Ito |
| 9,609,247 B2 | 3/2017 | Suzuki et al. |
| 2006/0132635 A1 | 6/2006 | Land |
| 2006/0163474 A1 | 7/2006 | Denvir |
| 2007/0214200 A1 | 9/2007 | Hazelwood |
| 2008/0180791 A1 | 7/2008 | Schreiber et al. |
| 2012/0044476 A1 | 2/2012 | Earhart et al. |
| 2013/0140433 A1 | 6/2013 | Oggier et al. |
| 2015/0028213 A1 | 1/2015 | Weinberg et al. |
| 2015/0285625 A1 | 10/2015 | Deane |
| 2016/0041266 A1 | 2/2016 | Smits |
| 2019/0018119 A1 | 1/2019 | Laifenfeld et al. |

OTHER PUBLICATIONS

International Search Report dated Jul. 13, 2018.
Fellers "Electron Multiplying Charge-Coupled Devices (EMCCDs)" Year: 2014.

* cited by examiner

METHOD AND SYSTEM TO DETERMINE DISTANCE USING TIME OF FLIGHT MEASUREMENT COMPRISING A CONTROL CIRCUITRY IDENTIFYING WHICH ROW OF PHOTOSENSITIVE IMAGE REGION HAS THE CAPTURED IMAGE ILLUMINATION STRIPE

FIELD OF INVENTION

The invention relates to a time of flight distance sensor and method of use.

BACKGROUND TO THE INVENTION

Accurate and fast surface profile measurement is a fundamental requirement for many applications including industrial metrology, machine guarding and safety systems as well as automotive driver assistance and collision warning systems.

Many different approaches have been developed over the years with the objective of providing a low cost yet high performance surface profile solution.

Sensors based on triangulation measurement techniques using structured illumination patterns have proven to be very successful in short range applications such as gesture control, gaming and industrial metrology but their inability to cope with high ambient light levels have tended to restrict their use to indoor applications or applications where the overall illumination level can be controlled.

To overcome these constraints, much effort has been expended on developing pixelated focal plane arrays able to measure the time of flight of modulated or pulsed infra-red (IR) light signals and hence measure 2D or 3D surface profiles of remote objects. A common approach is to use synchronous or "lock-in" detection of the phase shift of a modulated illumination signal. In the simplest form of such devices, electrode structures within each pixel create a potential well that is shuffled back and forth between a photosensitive region and a covered region. By illuminating the scene with a modulated light source (either sine wave or square wave modulation has been used) and synchronising the shuffling process with the modulation, the amount of charge captured in each pixel's potential well is related to the phase shift and hence distance to the nearest surface in each pixel's field of view. By using charge coupled device technology, the shuffling process is made essentially noiseless and so many cycles of modulation can be employed to integrate the signal and increase the signal to noise ratio. This approach with many refinements is the basis of the time of flight focal plane arrays manufactured by companies such as PMD, Canesta (Microsoft) and Mesa Imaging.

Whilst such sensors can provide high resolution their performance is limited by random noise sources including intrinsic circuit noise and particularly the shot noise generated by ambient light. Furthermore, the covered part of each pixel reduces the proportion of the area of each pixel able to receive light (the "fill factor"). This fill factor limitation reduces the sensitivity of the sensor to light and requires higher emission power to overcome. In addition, this technique can only make one distance measurement per pixel and so is unable to discriminate reflections from a far object and those from atmospheric effects such as fog, dust, rain and snow, restricting the use of such sensors technologies to indoor, covered environments.

To overcome these problems companies such as Advanced Scientific Concepts Inc. have developed solutions whereby arrays of avalanche photodiodes (APD) are bump bonded to silicon readout integrated circuits (ROIC) to create a hybrid APD array/ROIC time of flight sensor. The APDs provide gain prior to the readout circuitry thus helping to reduce the noise contribution from the readout circuitry whilst the ROIC captures the full time of flight signal for each pixel allowing discrimination of atmospheric obscurants by range. However, the difficulties and costs associated with manufacturing dense arrays of APDs and the yield losses incurred when hybridising them with ROIC has meant that the resolution of such sensors is limited (e.g. 256×32 pixels) and their prices are very high.

Some companies have developed systems using arrays of single photon avalanche detectors (SPAD) operated to detect the time of flight of individual photons. In principle such sensors can be manufactured at low cost using complementary metal-oxide semi-conductor (CMOS) processes. However, the quantum efficiency of such sensors is poor due to constraints of the CMOS process and their fill factor is poor due to the need for circuitry at each pixel to ensure correct operation. This combination of poor quantum efficiency and low fill factor this leads to very poor overall photon detection efficiency despite the very high gain of such devices.

In addition, without care, avalanche multiplication based sensors can be easily damaged by optical overloads (such as from the sun or close specular reflectors in the scene) as the avalanche multiplication effect when applied to the overload will lead to extremely high current densities in the region of the overload, risking permanent damage to the device structure.

An alternative approach that has been attempted is to provide each pixel with its own charge coupled or CMOS switched capacitor delay line, integrated within the pixel, to capture the time of flight signal. An advantage of this approach is that the time of flight can be captured at high frequency to provide good temporal and hence range resolution, but the signal read-out process can be made at a lower frequency, allowing a reduction in electrical circuit bandwidth and hence noise. However, if the delay lines have enough elements to capture the reflected laser pulse from long range objects with good distance resolution, then they occupy most of the pixel area leaving little space for a photosensitive area. Typically, this poor fill factor more than offsets the benefits of the slower speed readout and so high laser pulse power is still required, significantly increasing the total lidar sensor cost. To try to overcome this problem some workers have integrated an additional amplification stage between the photosensitive region and the delay line but this introduces noise itself, thus limiting performance.

Thus, there is a need for a solution able to offer the low noise and extended operating range performance of hybrid APD array/ROIC based lidars but with the lower costs and more robust behaviour of monolithic focal plane time of flight arrays.

SUMMARY OF THE INVENTION

According to a first aspect of the invention, there is provided a time of flight distance measurement method comprising:
- emitting a pulsed fan beam from a light emitter to illuminate a remote object with an object illumination stripe;
- capturing an image of the object illumination stripe as an image illumination stripe on a photosensitive image region of a time of flight sensor comprising an array of M columns of J rows of pixels, where both M and J are positive integers greater than 2, transferring data from the photosensitive image region to a storage region arranged not to respond to incident light, the storage region comprising M columns of N storage elements, along the M columns of the storage region from respective columns of the photosensitive image region; and reading out data in a readout section from the M columns of the storage region; the method comprising operating a self-calibration step including capturing the image illumination stripe on the photosensitive image region, then reading out the data from the image region via the storage region and the readout section and identifying which row of the photosensitive image region has the image illumination stripe; and operating a distance determining step including determining the distance to the remote object by clocking the image region while capturing the image of the object illumination stripe, reading out the data from the image region via the storage region and the readout section and determining the distance to the object.

By providing a self calibration step any inaccuracies in the exact location of the image illumination stripe can be corrected for and reliable distance measurement achieved.

In one approach, the self-calibration step comprises:

for a capturing period, leaving the photosensitive image region unclocked to capture an image of the image illumination stripe on the photosensitive image region, then clocking the image region (8), the storage region and the readout region to read out the captured image to identify the location of the image illumination stripe on the photosensitive image region (8); and calibrating the location of the image illumination stripe.

By leaving the image region without clock signals during the capturing period the location of the image illumination stripe can be reliably determined.

In a particular embodiment, the method may include determining that the image illumination stripe will be approximately in row Y;

applying (N+Y−K) clock cycles to the image region and storage region, where K is a positive integer at least 2; and reading out 2K rows of the store section to determine the actual row Ya of the image illumination stripe.

In this way, prior knowledge of the approximate position of the stripe can be used to speed up the calibration process.

In embodiments, the method may include controlling independently the clocking of the photosensitive image region, the storage region, and the readout section; the method comprising:

clearing the image region, storage region and readout section;

emitting a first laser pulse;

capturing a first illumination image on the image region;

clocking the image region and storage region sufficiently to transfer the first illumination image to the storage region;

emitting a second laser pulse;

clocking the image region and the storage region at the predetermined clock frequency to capture a second illumination image and transfer it to the storage region;

clocking the readout section to readout the storage section and identify the number of rows between the first and second illumination image; and determining the distance to the object from the number of rows between the first and second illumination image.

The image region may be driven with static potentials during the self-calibration step.

The self-calibration step and the distance determining step may be alternated for optimal calibration. Alternatively, calibration may be required less often, and the method may alternatively include carrying out a self-calibration step at less than 20% of the frequency of carrying out the distance determining step.

In another aspect, the invention relates to a time of flight distance measurement system, comprising:

a light emitter arranged to emit a pulsed fan beam for illuminating a remote object with a pulsed illumination stripe;

a time of flight sensor comprising:

a photosensitive image region comprising an array of M columns of P rows of pixels, where both M and P are positive integers greater than 2, arranged to respond to light incident on the photosensitive image region (8);

a storage region arranged not to respond to incident light, the storage region comprising M columns of N storage elements, arranged to transfer data along the M columns of storage from a respective one of the M pixels along column of N storage elements; and a readout section arranged to read out data from the M columns of the storage region; and circuitry for controlling the time of flight sensor to capture image data of the pulsed illumination stripe along a row of pixels and to transfer the captured image data to the storage section;

wherein the circuitry is arranged to operate the photosensitive image detector in a self-calibration step including capturing the image illumination stripe on the photosensitive image region, then reading out the data from the image region (8) via the storage region and the readout section and identifying which row of the photosensitive image region has the image illumination stripe; and in a distance determining step including determining the distance to the remote object by clocking the image region while capturing the image of the object illumination stripe, reading out the data from the image region via the storage region and the readout section and determining the distance to the object.

The time of flight sensor may be a charge coupled device. The use of a charge coupled device allows for a very high fill factor, i.e. a very large percentage of the area of the image section of the time of flight sensor may be sensitive to light. This increases efficiency, and allows for the use of lower power lasers.

In particular embodiments, photons incident over at least 90% of the area of the photosensitive image region are captured by the photosensitive image region.

BRIEF DESCRIPTION OF THE DRAWINGS

For a better understanding, embodiments of the invention will now be described with reference to the accompanying drawings, in which.

DETAILED DESCRIPTION

The inventor has realised that by combining an optimised sensor architecture with a novel operating method the poor fill factor and high readout noise problems of the existing sensors can be overcome in a very low cost and commercially advantageous manner.

Figure 1:
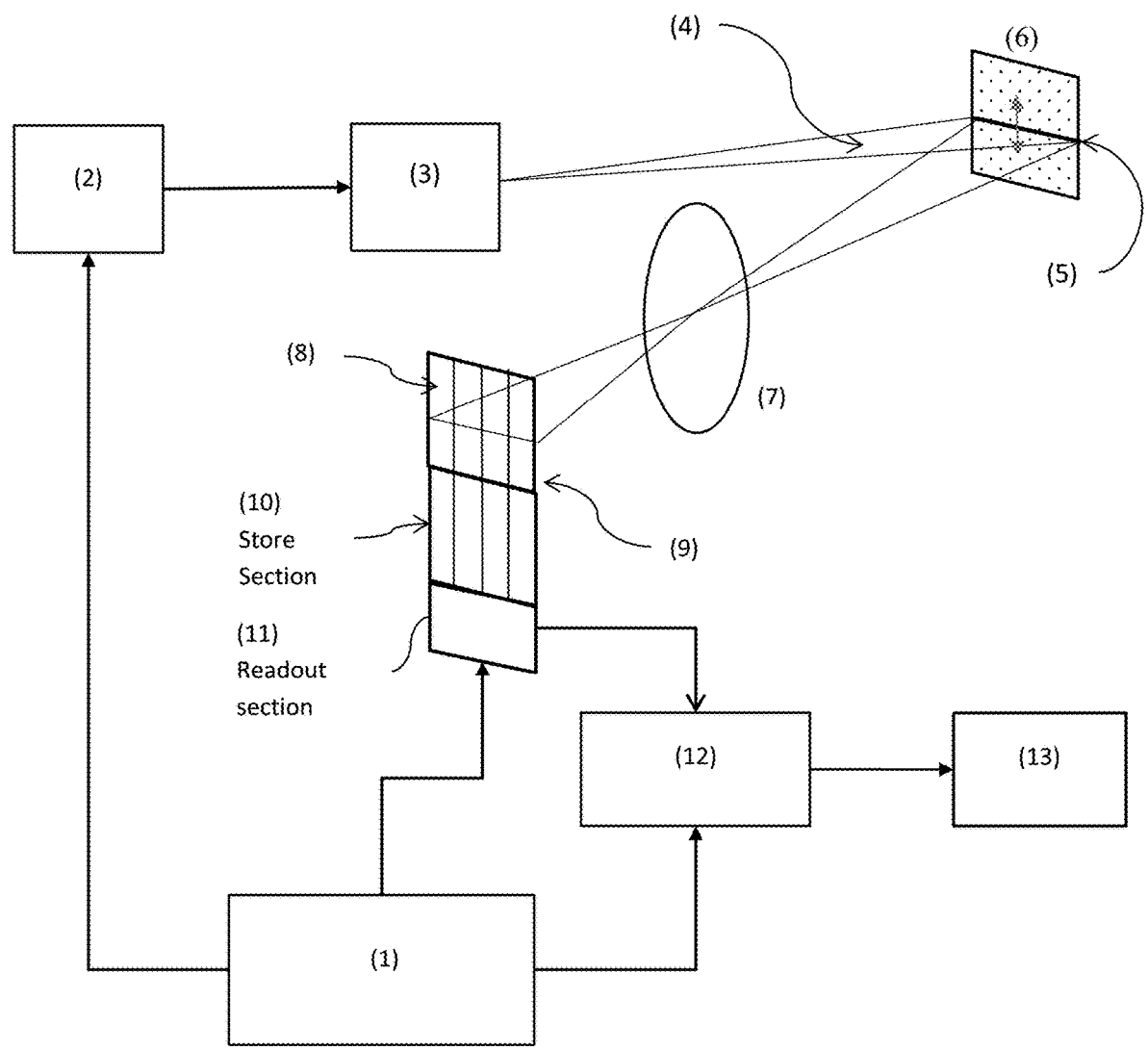
FIG. 1 shows a time of flight distance measuring system according to a first embodiment of the invention.

One embodiment is shown in FIG. 1.

Control electronics (1) are configured to control light source (2) and associated optical system (3) to emit a pattern of light with a pre-defined combination of spatial and temporal characteristics into the far field.

In the simplest embodiment shown in FIG. 1, the spatial distribution of the emitted light is a fan beam (4) whose location in a direction orthogonal to the long axis of the beam is adjustable under control of the control electronics (1) and the temporal characteristics of the light are a short pulse, emitted at a time T0, also under control of the control electronics (1).

This combination of spatial and temporal characteristics will create a pulsed stripe of illumination (5) across the surface of any remote object (6). This stripe on the object may be referred to as an object illumination stripe.

Figure 2:
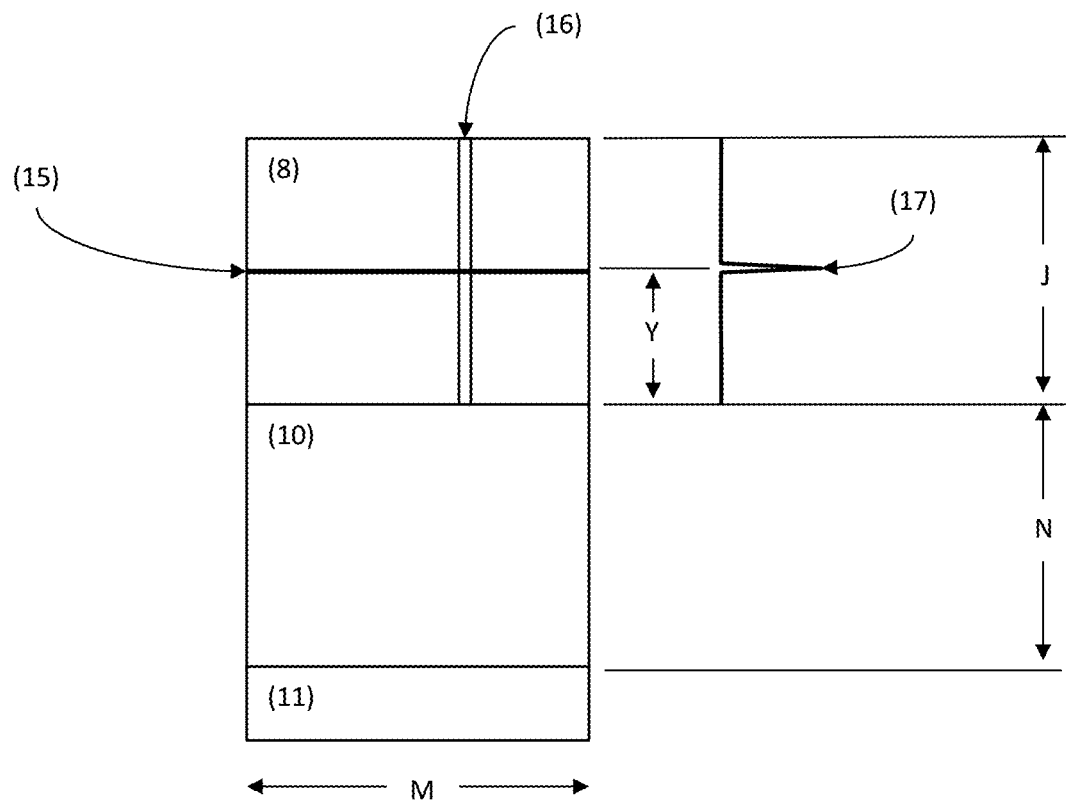
FIG. 2 illustrates a captured charge pattern captured by a time of flight distance measuring system according to embodiments of the invention.

Receive lens (7) is configured to collect and focus the reflected pulse of light from this stripe of illumination (5) onto the photosensitive image section (8) of a focal plane array (FPA) device (9) yielding a stripe of illumination (15) on the surface of the image area as illustrated schematically in FIG. 2. This stripe on the sensor will be referred to as an image illumination stripe.

It will be appreciated by those skilled in the art that the optical arrangement may be more complex than a single receive lens (7) and any optical system capable of focussing the object illumination stripe onto the image section (8) to achieve the image illumination stripe may be used.

By shifting the position of the fan beam, the vertical position of the intensity distribution at the image plane is also controllable.

As illustrated in FIG. 2, the image (8) section of the focal plane array (9) comprises an array of M columns and J rows of photosensitive pixels. The focal plane array device (9) also contains a store section (10) and readout section (11).

The store section (10) comprises M columns by N rows of elements and is arranged to be insensitive to light. The image and store sections are configured so that charge packets generated by light incident upon the pixels in the image section can be transferred along each of the M columns from the image section (8) into the corresponding column of the store section (10) at a transfer frequency Ft by the application of appropriate clock signals from the control electronics (1).

The image section (8) and store (10) section may be implemented as a charge coupled device (CCD) on a single die. The store section and readout section may be covered by a light shield. The use of a CCD allows for excellent fill factors, i.e. the percentage of area of the image sensor responsive to incoming photons. Efficient light collection is important and allows for the use of lower power lasers which may reduce the cost of the device. Efficient light collection also, in examples, means that there is no need for amplification and in particular no need for an avalanche photodiode. This can improve reliability and reduce noise and cost.

In order to maximise the fill factor, the image section interconnects may be made of transparent conductor, for example indium tin oxide, or alternatively the die may be thinned and used from the back.

In order to maximise the transfer frequency $F_T$ (described below) low impedance aluminium or other metallic connections may be used to transfer the clock signals from the outer to the centre of the image and store section regions.

The readout section (11) is arranged to readout data from the M columns of the storage region at a readout frequency $F_R$ (as described below) and is also configured to be insensitive to light. The readout section (11) may be implemented on the same die as the image and store sections.

Either one of a combination of the control electronics (1), processing electronics (2) and output circuitry (13) may also be fabricated on the same die as the image, store or readout sections.

The sequence of operation is as follows:

a) control electronics (1) commands the light source (2) and optical system (3) to set the location of the horizontal fan beam (3) so that any light from the pulsed illumination stripe (5) that is reflected from a remote object (6) will be focussed by lens (7) upon the image section (8) as a corresponding stripe (15) to yield an intensity distribution (17) that is ideally a delta function with a peak centred upon row Y as illustrated schematically in FIG. 2. This means that each column X of the sensor will see an intensity distribution with a peak centred at row Y.

b) The control electronics then operates image and store sections (8) and (10) to clear all charge from within them.

c) The control electronics causes light source (1) to emit a light pulse at time T0 and commences clocking the image (8) and store (10) sections at high frequency $F_T$, i.e. the transfer frequency, to transfer charge captured in the image section (8) along each column and into the store section (10). Using its apriori knowledge of Y, the control electronics applies a total of N+Y clock cycles to the image and store sections.

d) Whilst the image and store sections are being clocked, the pulsed fan beam (5) propagates out, reflects off remote objects (6) and is focussed onto the image area (8) to generate a set of charge packages in each column X along row Y at time T1(X) where T1(X)−T0 is the time of flight of the part of the fan beam that is incident upon an individual column X. The high-speed clocking of the image (8) and store (9) sections causes each charge package to be captured at R(X) clock cycles after the start of clocking (T0) where:

$$R(X) = (T1(X) - T0)F_T \qquad \text{Equation 1}$$

e) The clocking of the image and store sections causes the charge packages to moved N+Y rows down each column in a direction towards the store section, creating a spatially distributed set of charge packages within the store section, where the location of the centre of each charge packages R(X) corresponds to time of flight of the reflected light from a remote object (6) at the physical location in the far field corresponding to the intersection of column X and row Y.

f) The control electronics then applies clock pulses to the store (10) and readout sections (11) at the readout frequency $F_R$ to readout the captured packages of charge, passing them to processing electronics (12).

g) Processing electronics (12) then employ standard techniques to determine the location R(X) of the centre of any charge packages found within each column X of the array.

h) Hence, it can be seen that this sensor architecture and operating method has enabled the time of flight information (temporal domain) from a reflection in the far field to be converted into the spatial domain within the store section (10) so that the distance to a remote object can be determined from the position R(X) of a charge packet within the store section and the location of the remote object is defined in the X axis by the number X of the column that the charge packet was found in and in the Y axis by the location of the illumination stripe (Y).

For each column X, the processing electronics uses the speed of light (c) to calculate the distance D(X,Y) to each remote objects (6) illuminated by the fan beam (4) from the following equation:

$$D(X, Y) = \frac{c\, R(x)}{2 F_T} \qquad \text{Equation 2}$$

It should be noted that this process allows the distance to multiple objects at the same point X along the stripe of illumination to be determined, allowing reflections from snow, rain and fog to be captured and discriminated from reflections from true far objects (6).

i) The control electronics then repeats steps a) to h) sequentially, moving the position of the illumination stripe to gather additional sets of D(X,Y) distance data. In this way, the sensor builds up a complete three dimensional point cloud comprising a set of distance data points D(X,Y) that is transmitted via output circuitry (13).

It can be seen that this method of operation and the separation of the detector architecture into image, store and readout sections enables the whole of each image pixel to be photosensitive (i.e. 100% fill factor) because the charge to voltage conversion/readout process is physically remote on the detector substrate. In addition, the use of a store section enables the charge to voltage conversion/readout process to be carried out at a different time to the photon capture process.

These two factors deliver very significant benefits over all other time of flight sensors that are constrained by the necessity for photon capture, charge to voltage conversion and, in some cases, time discrimination to occur within each pixel.

i. The physical separation of the image section enables it to be implemented using well-known, low cost and highly optimised monolithic image sensor technologies such as charge coupled device (CCD) technology. This allows noiseless photon capture and transfer and, in addition to the 100% fill factor, very high quantum efficiency through the use of techniques such as back-thinning, back surface treatment and anti-reflection coating.

ii. The temporal separation of the high-speed photon capture and charge to voltage/readout process and the physical separation of the readout circuitry allows the readout circuitry and readout process to be fully optimised independent of the high-speed time of flight photon capture process.

For example the readout of the time of flight signal can be carried out at a significantly lower frequency ($F_R$) than its original high speed capture ($F_T$). This allows the noise bandwidth and hence the readout noise to be significantly reduced, but without the very poor fill factor and hence sensitivity losses encountered by other approaches that also seek to benefit from this option.

The significance of these benefits is such that an optimised light radar sensor can provide long range, high resolution performance without needing costly and complicated avalanche multiplication readout techniques.

Figure 3:
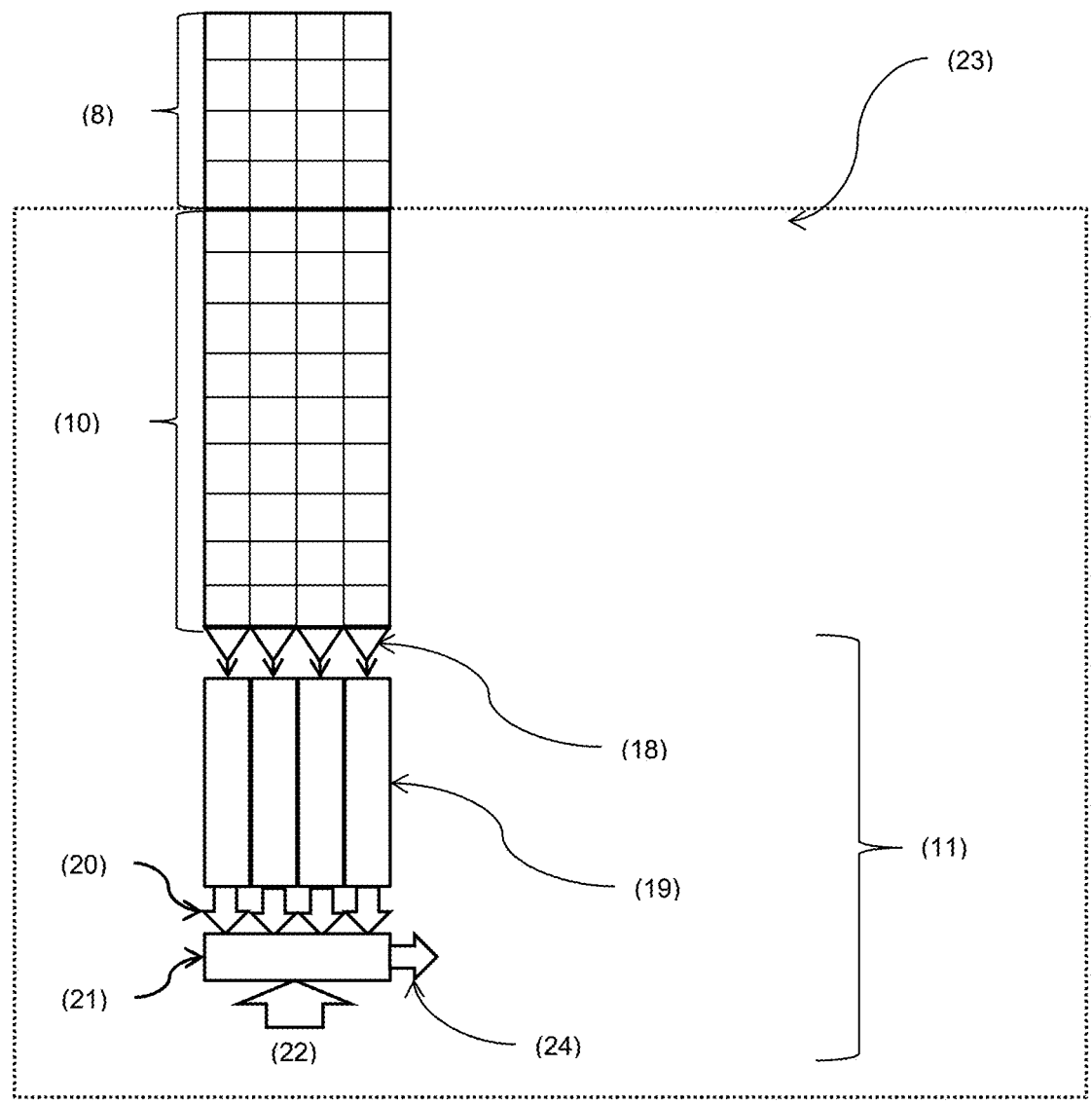
FIG. 3 illustrates an embodiment of a focal plane array device used in the time of flight distance measuring system.

In a preferred embodiment shown in FIG. 3, the readout electronics (11) are configured to allow readout from all columns to be carried out in parallel. Each column is provided with a separate charge detection circuit (18) and analogue to digital converter (19). The digital outputs (20) of each analogue to digital converter are connected to a multiplexer (21) that is controlled by an input (22) from the control electronics.

The store (10) and readout (11) sections are covered by an opaque shield (23).

During the readout operation, the control electronics applies control pulses to the store section (10) to sequentially transfer each row of photo-generated charge to the charge detectors (18). These convert the photo-generated charge to a voltage using standard CCD output circuit techniques such as a floating diffusion and reset transistor. The signal voltage from each column is then digitised by the analogue to digital converters (19) and the resultant digital signals (20) are sequentially multiplexed to an output port (24) by the multiplexor (21) under control of electrical interface (22).

By carrying out the sensor readout for all columns in parallel, this architecture minimises the operating readout frequency ($F_R$) and hence readout noise.

In other embodiments, it can be advantageous for the temporal distribution of the light source to be a maximal length sequence or other form of signal whose auto-correlation function equates to a delta function. In this case, the processing electronics will carry out a cross-correlation operation on the data set from each column and the location R(X) that equates to the time of flight will be determined by the location of the cross-correlation peak.

This process may be extended further so that the illumination comprises two (or more) stripes of illumination, with each stripe modulated in time by a different and orthogonal maximal length sequence. In this case, the processing electronics applies two (or more) cross correlation operations to the data from each column; each operation using the appropriate maximal length sequence as the correlation key to allow the time of flight data for each stripe of illumination to be decoded separately. The benefit of this technique is that it enables range data from multiple stripes to be captured simultaneously, speeding up the overall measurement process, albeit at the expense of additional computation.

The approach described above works very well, particularly where the position of the laser stripe of illumination is generated using fully solid state approaches such as a laser stripe array and associated optical system. In this case, the position Y of the laser stripe is varied by the control electronics (1) pulsing one of the laser stripes in the array.

Other approaches will use a micro-electro mechanical system (MEMS) mirror or optical phased array (OPA) to scan the beam.

However, it does require very precise and repeatable control of and knowledge of the position of the laser fan beam (Y). This is because any deviation in position of the image of the fan beam (dY) from the expected position (Y) will results in an error dR in the distance measurement, where:

$$dR = \frac{dY\, c}{2\, F_T} \quad \text{Equation 3}$$

In practice, there are several factors that may cause a deviation in the expected position Y including:
 a) temperature shifts or vibration may cause small deviations in the position of the beam;
 b) aberrations in the optics of the system may cause the illumination stripe to deviate from a straight line which will cause a deviation that varies for each column X.
 c) If the beam steering mechanism uses a micro-electronic mechanical system (MEMS) device or an optical phase array (OPA) then the position of the beam may deviate because the scanning drifts or is not precisely repeatable due to imperfections in these components.

It can be seen from equation 3 that the magnitude of this error may be reduced by increasing the fast capture frequency $F_T$, but it cannot be eliminated.

However, the inventor has realised that this problem may be overcome by taking advantage of the sensor architecture and adjusting the timing of the sensor clocking with respect to the laser pulsing to enable the sensor to capture the actual position Ya of the illuminated stripe. From this the deviation dY in the stripe position from its expected position can be determined and used to calculate the error distance dR which may be subtracted from R(X,Y) to remove the error.

In an embodiment this may be achieved as follows:
 a) Control electronics (1) applies static electrode potentials to the image section (8) of the time of flight focal plane array (9). This will put the image section into "integration mode": that is, the image section behaves as a series of image picture elements (pixels) where each element is sensitive to light and can capture electrons generated by photons incident upon the pixel.
 b) The control electronics then causes the light source (2) and optical system (3) to emit a pulse of light in the direction necessary to locate the image of the illumination stripe (15) on the focal plane at position Y.
 c) The control electronics maintains the image section (8) in the integration mode for a period of time greater than the maximum operating distance of the sensor. For example, if the maximum operating distance of the sensor is 300 m, then the control electronics will maintain the integration mode for 2 microseconds. This allows reflections from the regions of the remote object (6) illuminated by stripe (5) to be collected as a pattern of photo-generated charge within the image section of the time of flight focal plane array.
 d) Once the integration period has completed, the control electronics applies N clock cycles to both the image and store sections to transfer the captured pattern of photo-generated charge into the store section.
 e) After this operation the store section will contain in each column charge patterns generated by reflected light from far objects (6) whose centres indicate the actual location (Ya) of the illumination stripe within each column (X).
 f) The control electronics (1) then applies the appropriate clock pulses to the store (10) and readout (11) sections to readout these charge pattern into the processing electronics (12) where standard processing techniques are used to determine the centre of the actual location (Ya) of the illumination stripe for each column X and hence the deviation dY(X) between the actual (Ya) and expected location (Y). Using these dY(X) values, the error dR(X) is calculated for each column.
 g) After gathering this set of range error data, the control electronics operates the focal plane array in a "time of flight mode" as explained above to measure the distances to the remote objects (6) and then uses the dR(X) value to correct the measurement for each column and yield an error free result for each range measurement R(X,Y).
 h) This process is repeated for each different Y location required to gather a sufficiently dense point cloud for the application.

In this way, the time of flight sensor can be made completely self-calibrating for any errors in the laser stripe position or variation in laser stripe straightness or thickness providing the same processing technique is used for both the determination of the actual position of the stripe (Ya(X)) when in integration mode and the position of the reflection R(X) in time of flight mode.

The frequency with which the error determining step is carried out will depend upon the stability of the laser position with time. For example, if the system shows only a slow drift in the error in position of the illumination stripe with time, then the error measurement process need only be carried out infrequently. Alternatively the error measurement process may be carried out repeatedly and the results averaged to improve the error measurement accuracy.

If the time of flight system is operated in a dynamic environment where remote objects may be moving quickly, or the laser is being scanned quickly, then it is preferable to minimise the time difference between the measurement of the error dR(X) and the range R(X) to minimise the effect of any such movement.

In the simple method described above, the minimum time interval between the range error and range measurements is determined by the time taken to readout the whole of the focal plane array.

To reduce this time interval, it is preferable to use apriori knowledge of the approximate position Y of the image of the illumination stripe and rather than applying N clock cycles to the image and store sections to transfer the integration mode pattern of charge from the image into the store, to apply N+Y−K clock cycles. If there was no error in the position of the image of the illumination strip, this would transfer the image of the stripe to be K rows above the interface between the store and readout sections. However, by choosing K to be larger than the maximum difference between the actual position Ya and the expected position Y of the line, it is only necessary to readout 2K rows of the store section to capture the whole of the actual position of the line and to calculate the error dR(X).

In this way, the time interval between the measurement of range error and range is reduced to the time taken to read out 2K rows, which will be significantly less than the time taken to readout all N rows of the store section and so offers a useful improvement.

Figure 4:
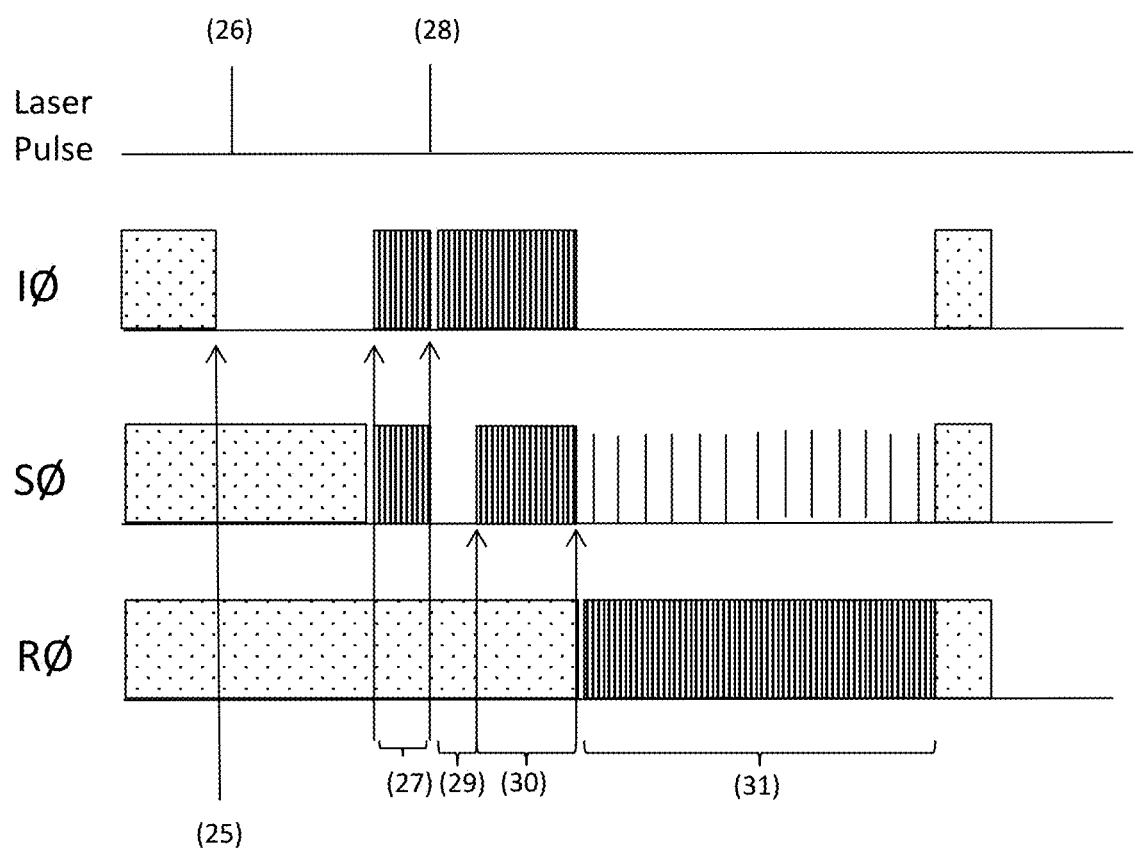
FIG. 4 illustrates clock signals used in a preferred embodiment of the invention.
Figure 5:
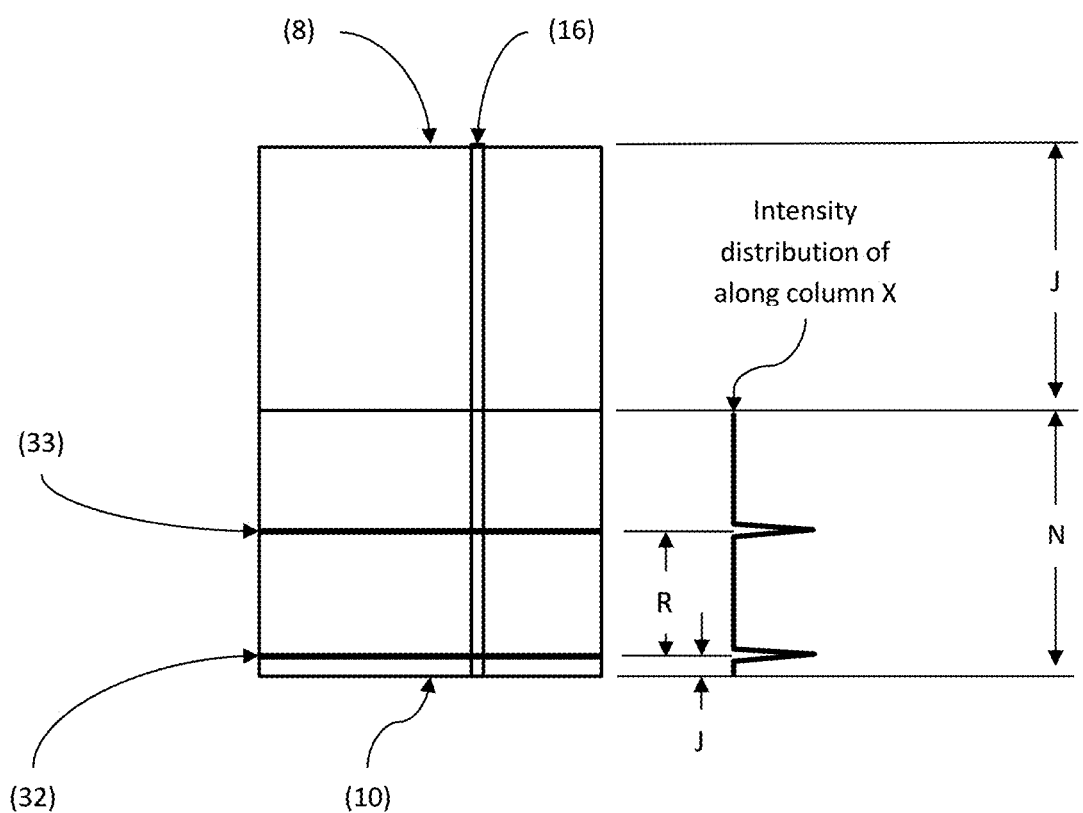
FIG. 5 illustrates a captured charge pattern according to alternative embodiments to FIG. 2, based on the clock signals of FIG. 4.

However, the time interval may be reduced to negligible levels using a further refinement to the approach that will be described with reference to FIG. 4, an outline timing diagram. FIG. 5 schematically illustrates an exemplary resulting charge pattern.

a) The control electronics initially applies the appropriate clock pulse sequences to the image, store and readout section clock electrodes (IØ, SØ, RØ respectively) to clear all these regions of charge.

b) This process is stopped for the image section (25) and the static potentials necessary to switch in into integration mode are applied. At the same time or shortly afterwards, the light source, beam steering and optical systems are commanded to emit a light pulse (26). The control electronics maintains the integration mode long enough to capture the reflected signal from the far object as explained previously.

c) The control electronics then stops the charge clearing process in the store section and applies Y clock cycles to the image and store sections (27) to transfer the captured charge pattern equating to the image of the reflected pulse of illumination into a region at the top of the store section.

d) The control electronics then causes the light source to emit a second light pulse (28) and starts to apply high frequency ($T_F$) clock cycles to the image section (8) to initiate the time of flight capture mode. After Y clock cycles have been applied to the image section (29) the control electronics applies a further N–K high frequency clock cycles to both the store and image section together (30) to complete the time of flight signal capture.

e) This effect of the sequence of operations described above is that within each column (X) the store section now contains one charge pattern (32) generated by the reflected light of the far object captured during the integration mode that will be located K rows above the bottom of the store section if there has been no error in the illumination position; and a second charge pattern (33) generated by the reflected light from the same point on the far object but captured during the high speed clocking, time of flight mode and therefore shifted in spatial position by R(X) rows along column X. See FIG. 5. It will be understood that both the charge pattern captured during integration and time of flight modes will both be subject to any error in the Y position of the illumination source by the same amount and so the separation of the two charge patterns (R) is directly proportional to the time of flight and hence distance to the far object by equation 2, independent of any error in the illumination position.

f) The control electronics then applies clock cycles to the store and readout sections of the device to convert and read out the charge patterns (32) and (33) as electrical signals.

g) The processing electronics (12) then process each column X of signal data to determine the separation R(X) of the signals captured in time of flight mode and hence the distance D(X,Y) to the far object using equation 2.

The processing electronics may also calculate the position J(X) of the signal related to the image of the reflection captured during the integration mode and use this to calculate the error dY(X) in the position of the fan beam in column X where:

$$dY(X)=J(X)-K$$

This information may be used to track any changes in the error dY(X) with Y position, time or environmental factors.

h) The control electronics then repeats steps a) to g) shifting the position of the illumination fan beam in the Y axis each time as necessary to capture a full point cloud.

The invention claimed is:

1. A time of flight distance measurement method comprising:
   emitting a pulsed fan beam from a light emitter to illuminate a remote object with an object illumination stripe (5);
   capturing an image of the object illumination stripe as an image illumination stripe (15) on a photosensitive image region (8) of a time of flight sensor (9) comprising an array of M columns of J rows of pixels, where both M and J are positive integers greater than 2,
   transferring data from the photosensitive image region (8) to a storage region (9) arranged not to respond to incident light, the storage region comprising M columns of N storage elements, along the M columns of the storage region from respective columns of the photosensitive image region; and
   reading out data in a readout section (11) from the M columns of the storage region (2); the method comprising
   operating a self-calibration step including capturing the image illumination stripe (15) on the photosensitive image region (8), then reading out the data from the image region (8) via the storage region (10) and the readout section (11) and identifying which row of the photosensitive image region has the image illumination stripe; and
   operating a distance determining step including determining the distance to the remote object by clocking the image region (8) while capturing the image of the object illumination stripe (15), reading out the data from the image region (8) via the storage region (10) and the readout section (11) and determining the distance to the object.

2. A time of flight distance measurement method according to claim 1, comprising:
   driving the image region with static potentials during the self-calibration step.

3. A time of flight distance measurement method according to claim 1, wherein:
   the self-calibration step comprises:
   not clocking the photosensitive image region (8) for a capturing period to capture an image of the image illumination stripe on the photosensive image region, then
   clocking the image region (8), the storage region (10) and the readout region (11) to read out the captured image to identify the location of the image illumination stripe on the photosensitive image region (8); and
   calibrating the location of the image illumination stripe.

4. A time of flight distance measurement method according to claim 1, comprising:
   determining that the image illumination stripe will be approximately in row Y;
   applying (N+Y−K) clock cycles to the image region and storage region, where K is a positive integer at least 2; and
   reading out 2K rows of the store section to determine the actual row Ya of the image illumination stripe.

5. A time of flight distance measurement method according to claim 3, wherein the method comprises controlling independently the clocking of the photosensitive image region, the storage region, and the readout section; the method comprising:
- clearing the image region, storage region and readout section;
- emitting a first laser pulse;
- capturing a first illumination image on the image region;
- clocking the image region and storage region sufficiently to transfer the first illumination image to the storage region;
- emitting a second laser pulse;
- clocking the image region and the storage region at the predetermined clock frequency to capture a second illumination image and transfer it to the storage region;
- clocking the readout section to readout the storage section and identify the number of rows between the first and second illumination image; and
- determining the distance to the object from the number of rows between the first and second illumination image.

6. A time of flight distance measurement method according to claim 1 further comprising:
- alternating the self-calibration step and the distance determining step.

7. A time of flight distance measurement method according to claim 1 further comprising:
- carrying out a self-calibration step at less than 20% of the frequency of carrying out the distance determining step.

8. A time of flight distance measurement system, comprising:
- a light emitter (2,3) arranged to emit a pulsed fan beam for illuminating a remote object with a pulsed illumination stripe;
- a time of flight sensor (9) comprising:
  - a photosensitive image region (8) comprising an array of M columns of P rows of pixels, where both M and P are positive integers greater than 2, arranged to respond to light incident on the photosensitive image region (8);
  - a storage region (10) arranged not to respond to incident light, the storage region comprising M columns of N storage elements, arranged to transfer data along the M columns of storage from a respective one of the M pixels along column of N storage elements; and
  - a readout section (11) arranged to read out data from the M columns of the storage region; and
- circuitry (1) for controlling the time of flight sensor (6) to capture image data of the pulsed illumination stripe along a row of pixels and to transfer the captured image data to the storage section;
- wherein the circuitry is arranged to operate the time of flight sensor in a self-calibration step including capturing the image illumination stripe on the photosensitive image region (8), then reading out the data from the image region (8) via the storage region (10) and the readout section (11) and identifying which row of the photosensitive image region has the image illumination stripe; and
- in a distance determining step including determining the distance to the remote object by clocking the image region while capturing the image of the object illumination stripe, reading out the data from the image region (8) via the storage region (10) and the readout section (11) and determining the distance to the object.

9. A time of flight distance measurement system according to claim 8, wherein the time of flight sensor is a charge coupled device.

10. A time of flight distance measurement system according to claim 8, wherein photons incident over at least 90% of the area of the photosensitive image region are captured by the photosensitive image region.

* * * * *